(12) United States Patent
Shimizu et al.

(10) Patent No.: US 11,858,448 B2
(45) Date of Patent: Jan. 2, 2024

(54) AIRBAG DEVICE AND VEHICLE SEAT

(71) Applicant: Autoliv Development AB, Vargarda (SE)

(72) Inventors: Takayuki Shimizu, Kanagawa (JP); Atsushi Nakashima, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/904,169

(22) PCT Filed: Jan. 20, 2021

(86) PCT No.: PCT/JP2021/001834
§ 371 (c)(1),
(2) Date: Aug. 12, 2022

(87) PCT Pub. No.: WO2021/161748
PCT Pub. Date: Aug. 19, 2021

(65) Prior Publication Data
US 2023/0069779 A1 Mar. 2, 2023

(30) Foreign Application Priority Data

Feb. 16, 2020 (JP) ................................. 2020-023895
Jun. 29, 2020 (JP) ................................. 2020-112188

(51) Int. Cl.
*B60R 21/207* (2006.01)
*B60R 21/231* (2011.01)
(Continued)

(52) U.S. Cl.
CPC .......... *B60R 21/207* (2013.01); *B60R 21/231* (2013.01); *B60R 21/233* (2013.01);
(Continued)

(58) Field of Classification Search
CPC ... B60R 21/207; B60R 21/231; B60R 21/233; B60R 2021/0044; B60R 2021/0048;
(Continued)

(56) References Cited

U.S. PATENT DOCUMENTS 9,969,351 B2 * 5/2018 Ohno ................ B60R 21/23138
11,230,251 B2 * 1/2022 Tanaka .............. B60R 21/23138
(Continued)

FOREIGN PATENT DOCUMENTS

DE 102004001216 B4 * 2/2017 ........... B60R 21/207
EP 2567870 A1 * 3/2013 ........... B60R 21/207
(Continued)

*Primary Examiner* — Keith J Frisby
(74) *Attorney, Agent, or Firm* — Harness, Dickey & Pierce, P.L.C.; Stephen T. Olson

(57) ABSTRACT

An airbag device equipped in a vehicle seat. The vehicle seat has a structure in which a seat frame is arranged with left and right sides inside the seat back. The airbag device according to the present invention includes: an inflator that is secured to the side of the seat frame of the vehicle seat and an airbag that is stowed inside the seat back in an elongated and compressed state and is expanded and deployed by the expansion gas discharged from the inflator. The airbag in the stowed state is arranged along the seat frame, and includes a lower portion area lower than the inflator and an upper portion area above the inflator. The lower portion area is arranged inside the seat frame, and the upper portion area is arranged outside the seat frame.

11 Claims, 9 Drawing Sheets

(51) Int. Cl.
*B60R 21/233* (2006.01)
*B60R 21/00* (2006.01)

(52) U.S. Cl.
CPC ............... *B60R 2021/0044* (2013.01); *B60R 2021/0048* (2013.01); *B60R 2021/23308* (2013.01)

(58) Field of Classification Search
CPC .......... B60R 2021/23146; B60R 2021/23161; B60R 2021/23308; B60R 2021/23138; B60R 21/23138
USPC ................................. 280/728.2, 730.1, 743.1
See application file for complete search history.

(56) References Cited

U.S. PATENT DOCUMENTS

| | | | |
|---|---|---|---|
| 2007/0228699 A1 | 10/2007 | Bederka et al. | |
| 2009/0020988 A1* | 1/2009 | Sato | B60R 21/23138 280/730.2 |
| 2017/0182962 A1* | 6/2017 | Hiraiwa | B60R 21/2346 |
| 2017/0225640 A1* | 8/2017 | Ohno | B60R 21/264 |
| 2017/0369020 A1* | 12/2017 | Hiraiwa | B60R 21/207 |
| 2018/0050651 A1* | 2/2018 | Fukawatase | B60R 21/233 |
| 2018/0194317 A1 | 7/2018 | Barbat et al. | |
| 2019/0023217 A1* | 1/2019 | Ohno | B60R 21/23138 |
| 2020/0346611 A1* | 11/2020 | Kobayashi | B60R 21/261 |
| 2021/0162942 A1* | 6/2021 | Kobayashi | B60R 21/233 |
| 2022/0126779 A1* | 4/2022 | Kobayashi | B60R 21/239 |
| 2022/0227326 A1* | 7/2022 | Kobayashi | B60N 2/58 |
| 2022/0281404 A1* | 9/2022 | Nakajima | B60R 21/233 |
| 2022/0379833 A1* | 12/2022 | Shimizu | B60R 21/2338 |
| 2023/0034054 A1* | 2/2023 | Shimizu | B60R 21/237 |

FOREIGN PATENT DOCUMENTS

| | | |
|---|---|---|
| JP | 2011-51414 A | 3/2011 |
| JP | 2020-501971 A | 1/2020 |
| WO | 2018/105324 A1 | 6/2018 |

\* cited by examiner

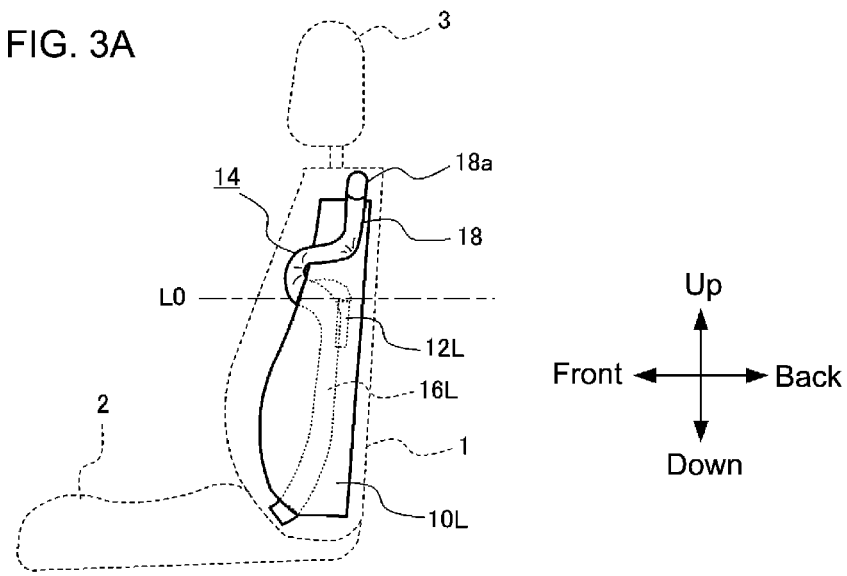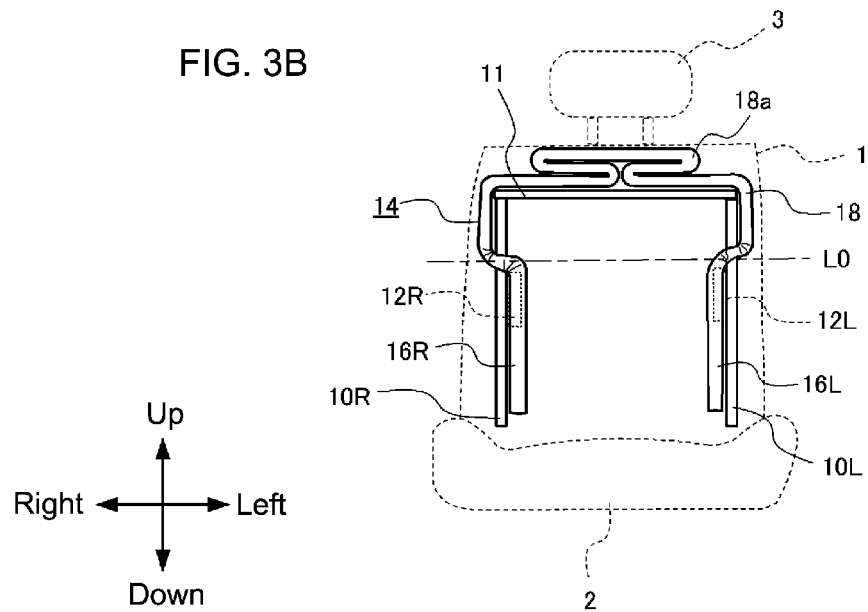

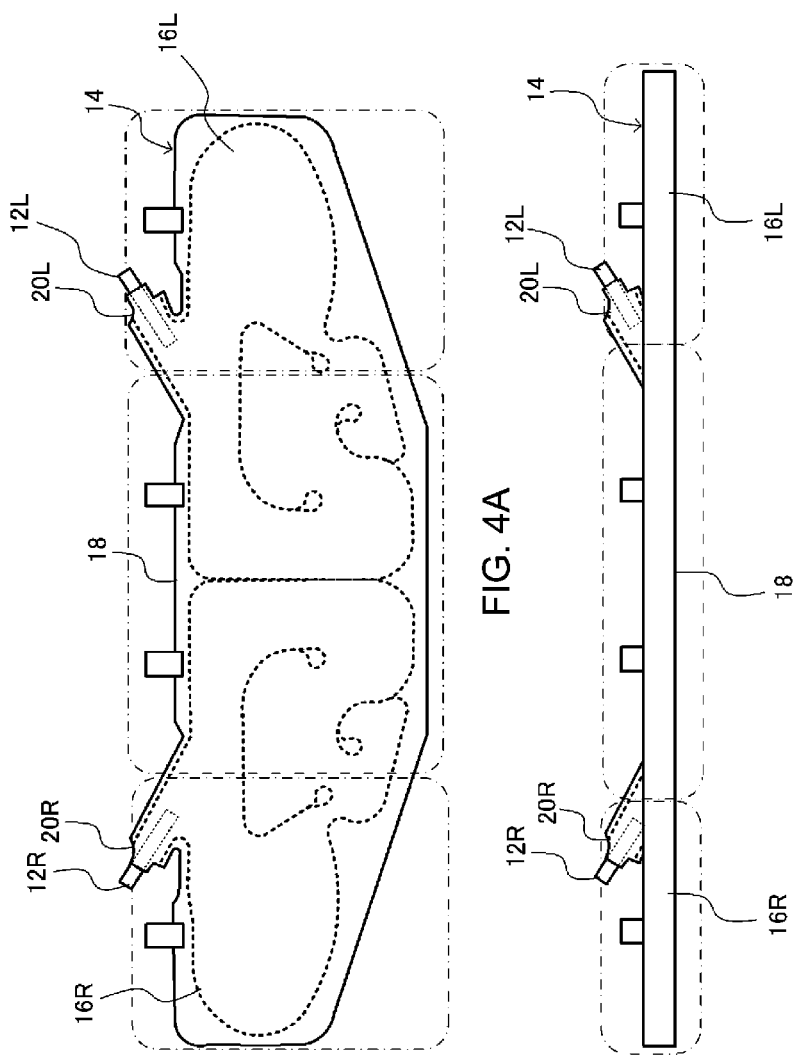

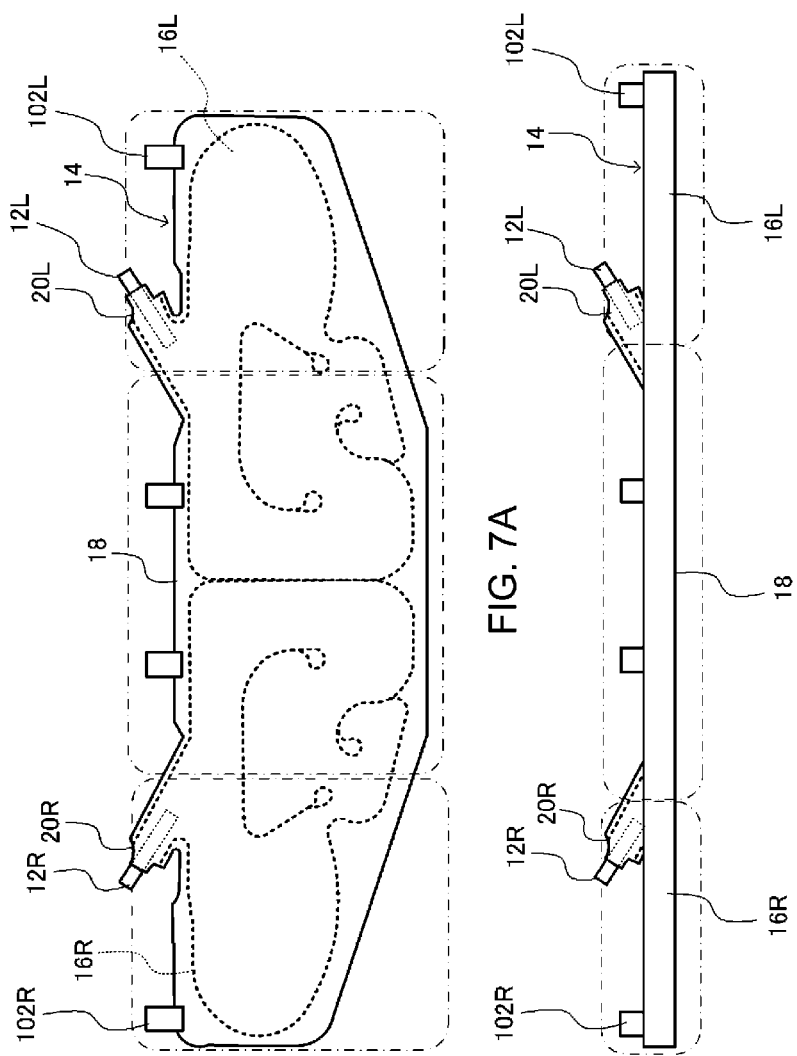

A1-A1 CROSS SECTION

Back
Right ← → Left
Front

AIRBAG DEVICE AND VEHICLE SEAT

TECHNICAL FIELD

The present invention relates to a vehicle seat and an airbag device installed in said seat. In particular, the present invention relates to an airbag device that can reliably restrain the occupant in question regardless of the posture of the occupant seated in the seat.

BACKGROUND ART

The provision of a vehicle with one or more airbags in order to protect the occupants thereof in the event of a vehicle accident is well known. These airbags include, for example, various forms such as: a so-called driver airbag which is deployed from near the center of the steering wheel so as to protect the driver; a curtain airbag which is deployed downward on the inner side of the window of an automobile so as to protect occupants during collisions in the transverse direction of a vehicle, as well as when overturning and during rollover accidents; and a side airbag which is deployed between the occupant and the side panel so as to protect the occupant upon impact in the transverse direction of a vehicle.

In recent years, with the advancement of automatic vehicle driving technology, occupants are anticipated to adopt various seating postures, such as a relaxed posture with the seat largely reclined, and such occupants need to be properly protected in such situations.

However, the well-known side airbag system installed in vehicle seats deploys airbags from one or both sides of the seat, making it difficult to adequately protect occupants in various postures.

SUMMARY OF THE INVENTION

Problem to be Solved by the Invention

The present invention has been created in view of the abovementioned problems, an object thereof is to provide an airbag device that may reliably restrain the occupant regardless of the posture of the occupant seated in the seat.

Means to Solve the Problem

The following describes means for solving the problem described above and the effect thereof. In the present invention, when an occupant is seated in a seat in a regular posture, the direction the occupant faces is referred to as the "front," the opposite direction is referred to as the "rear," and the direction indicating the coordinate axis is referred to as the "front-to-back direction." Moreover, when the passenger is seated in the seat in a regular posture, the right of the passenger is referred to as the "right direction," the left of the passenger is referred to as the "left direction," and the direction indicating the coordinate axis is referred to as the "left and right direction." Similarly, when the passenger is seated in the seat in a regular posture, the head direction of the passenger is referred to as "up," the waist direction of the passenger is referred to as "down," and the direction indicating the coordinate axis is referred to as the "vertical direction."

In order to achieve the object described above, the present invention relates to an airbag device installed in a vehicle seat. The vehicle seat has a structure in which a seat frame is arranged with left and right sides inside the seat back. The airbag device according to the present invention includes: an inflator that is secured to the side of the seat frame of the vehicle seat and an airbag that is stowed inside the seat back in an elongated and compressed state and is expanded and deployed by the expansion gas discharged from the inflator. The airbag in the stowed state is arranged along the seat frame, and includes a lower portion area lower than the inflator and an upper portion area above the inflator. The lower portion area is arranged inside the seat frame, and the upper portion area is arranged outside the seat frame.

Note, "seat frame is arranged on the left and right side portions inside the seatback" is indicated but the seat frame may include a frame in addition to the seat frame on the left and right sides (side frames), for example, frames that extend in the horizontal direction connected to the frames on the left and right sides.

In addition, "elongated and compressed" means a state of being formed into a rod shape by a method such as rolling or folding, and the method of compression does not matter.

In addition, "inside of the seat frame" means the occupant side of the seat frame extending in the vertical direction, and "outside of the seat frame" means the side opposite of the occupant.

In addition, "below the inflator" and "above the inflator" do not strictly mean above the upper end of the inflator and below the lower end of the inflator but mean, for example, using the inflator secured to the seat frame as a reference, in general below or above the securing part of the inflator.

In the present invention as described above, when the airbag is divided into upper and lower parts with the inflator as a boundary, the lower portion area below is arranged inside the seat frame, and the upper portion area above is arranged outside the seat frame. Therefore, when the airbag deploys, the lower portion area can deploy toward the occupant using the inner surface of the seat frame (the surface facing the occupant) as a reaction force surface, thereby quickly restraining the occupant from the waist to the chest area.

On the other hand, since the upper portion area is deployed outside the seat frame, the upper portion broadens more in the width direction than the lower portion area when viewing the seat from the front, and the head and shoulders of the occupant can be reliably restrained. Since the width of the human body is widest at the shoulders and the upper body tends to move significantly from side to side, protecting from the head to the shoulders of the occupant by a spacious upper portion area is important.

In addition, the upper portion area can enter the lower side of the seat belt SB near the shoulder of the occupant, and thus can be deployed by using the reaction force of the seatbelt, and this contributes to stable deployment shape around the head of the occupant.

When the airbag is deployed, the lower portion area mainly protects the waist and chest areas of the occupant, and the upper portion area mainly protects the head area of the occupant.

Lower portion areas can be arranged on both left and right sides of the seat back, and the upper portion area can be arranged to connect upper end portions of the lower portion areas on both the left and right sides.

In addition, the upper portion area can be configured to deploy from the vicinity of the upper edge of the seatback and deploy to encircle the head of the occupant.

In this case, the left and right lower portion areas and the central upper portion area are connected, and the airbag deploys in a dome shape to completely cover the sides and upper portion of the occupant seated in the seat. As a result, the airbag can reliably restrain movement of the occupant at least in the left-right direction, upward, and diagonally upward, and provide suitable protection from the head to the waist of the occupant.

One each inflator can be arranged on both the left and right sides of the seat frame, near the boundary between the lower portion area and the upper portion area.

The inflator can be arranged on the inside or outside of the seat frame.

When the inflator is arranged inside the seat frame, the lower portion area can be deployed quickly. On the other hand, when the inflator is arranged outside the seat frame, an installation location for the inflator can be readily ensured, in other words, the inflator can be readily secured to the seat frame with a high degree of freedom.

The airbag can include a securing tab having one end connected to the lower portion area and the other end of the tab secured to the seat frame. One end of the tab is preferably connected to the lowest end of the lower portion area of the airbag.

By securing the lower portion area of the airbag to the seat frame using a tab, the lower portion area does not burst forward or flap when the airbag is deployed, and the deployment posture and deployment behavior of the lower portion area is stabilized. As a result, the vicinity of the waist of the occupant can reliably be restrained inside the seat frame.

The other end of the tab can be secured to the rear end of the seat frame. Alternatively, the other end of the tab can extend past the rear end of the seat frame and be secured to the outside of the seat frame.

Note, the term "rear end portion of the seat frame" is a concept including the rearmost portion of the seat frame of the vehicle seat. In addition, "passing through the rear end portion of the seat frame" is a concept that includes the state of reaching from the inside of the seat frame (occupant side), through the rear of the rear end portion (rear surface part), and to the outside of the seat frame.

BRIEF DESCRIPTION OF THE DRAWINGS

FIG. 3 is a side view (A) and front view (B) illustrating an airbag device according to Embodiment 1 of the present invention mounted in a vehicle seat, where the vehicle seat is illustrated as see-through;

FIG. 4 illustrates the structure of the airbag used in the airbag device according to Embodiment 1 of the present invention. (A) is a plan view illustrating the state where the airbag is spread out (in the flat condition prior to being stowed), and (B) is a front view illustrating the state where the airbag is in a rolled state (in the stowed condition);

FIG. 6 is a side view (A) and front view (B) illustrating an airbag device according to Embodiment 2 of the present invention mounted in a vehicle seat, where the vehicle seat is illustrated as see-through;

FIG. 7 illustrates the structure of the airbag used in the airbag device according to Embodiment 3 of the present invention. (A) is a plan view illustrating the state where the airbag is spread out (in the flat condition prior to being stowed), and (B) is a front view illustrating the state where the airbag is in a rolled state (in the stowed condition);

DESCRIPTION OF THE PREFERRED EMBODIMENTS

A vehicle seat according to an embodiment of the present invention will be described with reference to accompanying drawings. While this was stated above, "front" in each figure illustrates the front of the vehicle (in the direction of travel), "rear" illustrates the rear of the vehicle (opposite the direction of travel), "inside" illustrates the inside in the vehicle width direction (occupant side), and "outside" illustrates the outside in the vehicle width direction (opposite side of the occupant).

Figure 1:
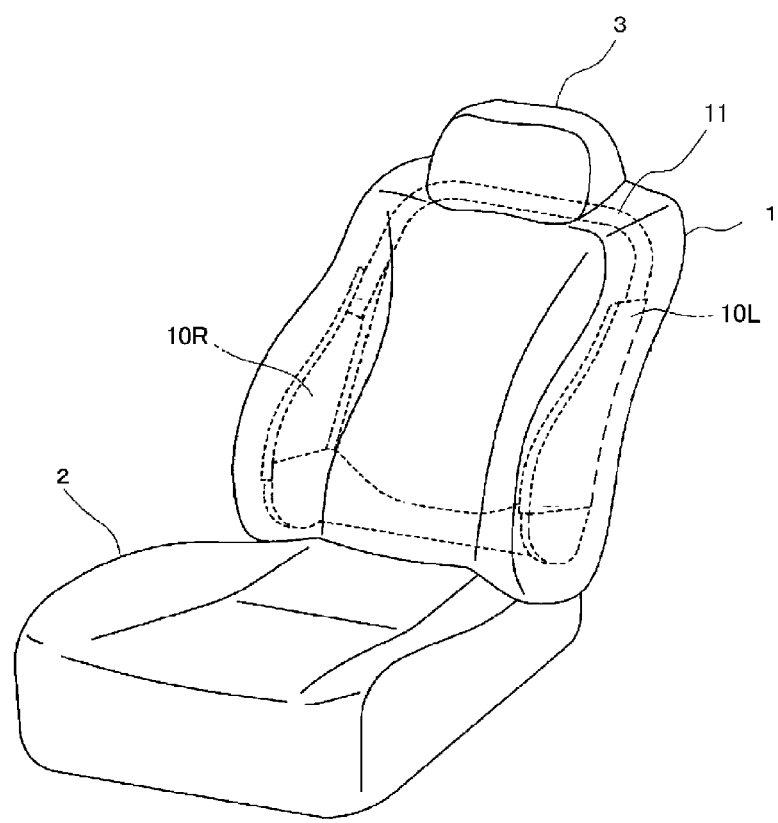
FIG. 1 is a perspective view illustrating mainly the external shape of a vehicle seat capable of having the side airbag device according to the present invention mounted therein, with illustration of the side airbag device omitted.
Figure 2:
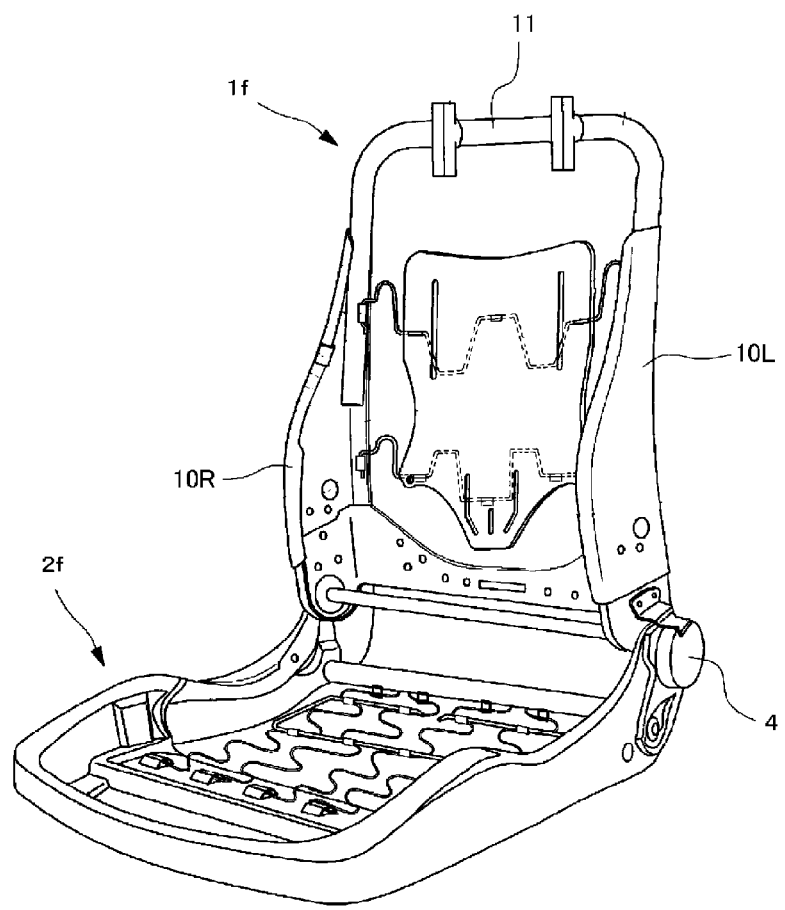
FIG. 2 is a perspective view illustrating an internal structure (seat frame) functioning as a framework of the vehicle seat illustrated in FIG. 1, with an illustration of the side airbag device omitted.

FIG. 1 is a perspective view illustrating mainly the appearance form of a vehicle seat to which the side airbag device according to the present invention can be applied, and the illustration of the side airbag device is omitted. FIG. 2 is a perspective view illustrating an internal structure (seat frame) functioning as a framework of the vehicle seat illustrated in FIG. 1, and the illustration of the side airbag device is omitted here as well.

As illustrated in FIG. 1, as the vehicle seat is viewed as a location, the seat cushion 2 where the occupant is seated; the seatback 1 forming a backrest; and the headrest 3 connected to the upper end of the seatback 1 are included.

As illustrated in FIG. 2, a seatback frame 1f that forms the framework of the seat is provided in the inner portion of the seatback 1, a pad composed of urethane foam or the like is provided on the surface and periphery thereof, and a surface skin (not shown) is provided. As for the seat cushion 2, similar to the seatback 1, a pad made of urethane foam or the like is provided on the upper surface and periphery of the seating frame 2f, and a surface skin (not illustrated) is provided. The seating frame 2f and the seatback frame 1f are connected via a reclining mechanism 4.

As illustrated in FIG. 2, the seatback frame 1f is configured as a frame form by the side frames 10L and 10R which are spaced apart to the left and right and extend in the vertical direction, the upper frame 11 that connects the upper end portions and the lower frame that connects the lower end portions of these side frames 10L and 10R Embodiment 1

FIG. 3 is a side view (A) and front view (B) illustrating an airbag device according to Embodiment 1 of the present invention mounted in a vehicle seat, where the vehicle seat is illustrated as see-through. FIG. 4 illustrates the structure of the airbag 14 used in the airbag device according to Embodiment 1. (A) is the plan view illustrating the state where the airbag 14 is spread out (flat condition prior to being stowed), and (B) is the front view illustrating the state where the airbag 14 is rolled (in the stowed condition).

The airbag device according to the present Embodiment contains a pair of inflators 12L and 12R that are stowed in the left and right side portions of the seatback 1 and produce expansion gas, and the airbag 14 that is stowed within the seat back 1 in a rolled or folded state and deployed by the expansion gas discharged by the inflators 12L and 12R. Note, in the present Embodiment, the seatback 1 is separated from the headrest 3, but the side airbag device according to the present invention can also be applied to a seatback with an integrated headrest.

The airbag 14 in the stowed state is arranged along the side frames 10L and 10R to the left and right, arranged along the lower portion areas 16L and 16R that are in lower positions than the inflators 12L and 12R, and arranged along the seat frame 11 in an upper portion in addition to the left and right side frames 10L and 10R, and contains upper portion area 18 which is in a higher position than the inflators 12L and 12R.

Note that in FIG. 3, the boundary position between the upper portion area 18 and the lower portion areas 16L and 16R of the airbag 14 is indicated by L0. In addition, in FIG. 4, a range corresponding to the lower portion areas 16L and 16R, and a range corresponding to the upper portion area 18 are illustrated by alternate long and short dashed lines. Also, symbols 20L and 20R, indicate the installation part of the inflators 12L and 12R.

The upper portion area 18 is formed to connect the upper end portion of the lower portion areas 16L and 16R on both the left and right sides and is configured to deploy from the upper edge vicinity of the seatback 1 to encircle the head of the occupant. In this manner, the lower portion areas 16L and 16R mainly protect the occupant from the waist to the chest area, and the upper portion area 18 mainly protects the head area (from shoulders to the head) of the occupant.

As illustrated in FIG. 3(B), the inflators 12L and 12R are secured to the inside of the side frames 10L and 10R by stud bolts (not shown) or the like. Also, the lower portion areas 16L and 16R are arranged inside the side frames 10L and 10R. On the other hand, the upper portion area 18 is arranged on the upper portion of the seat frame 11 through the outside of the side frames 10L and 10R. The upper portion area 18a on the seat frame 11 is stowed in an omega (Ω) shape, for example.

Note that, in the present invention, a single airbag 14 is described divided at the inflators 12L and 12R into the upper portion area 18 and the lower portion areas 16L and 16R, and at least, the part above the inflators 12L and 12R can be defined loosely as the upper portion area 18 and the lower side as the lower portion areas 16L and 16R.

When the airbag 14 is secured to the side frames 10L and 10R, as illustrated in FIG. 3B, the inflators 12L and 12R are secured to the inner side of the side frames 10L and 10R by stud bolts (not shown) with the airbag 14 in an elongated and compressed state. At this time, the lower portion areas 16L and 16R are also arranged inside the side frames 10L and 10R, and are secured to the side frames 10L and 10R by a connecting device such as a tab as necessary. The portion (upper portion area 18) above the inflators 12L and 12R is bent and arranged on the outside of the side frames 10L and 10R.

Figure 5A:
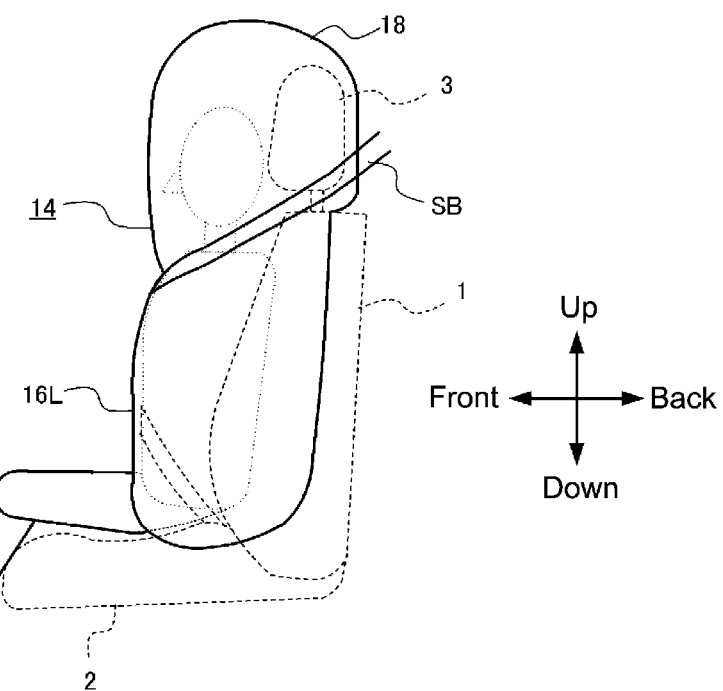
FIG. 5 illustrates an activated state (airbag deployed state) of the airbag device according to Embodiment 1 of the present invention. (A) illustrates this state viewed from the side in the vehicle width direction, and (B) illustrates this state viewed from the front.
Figure 5B:
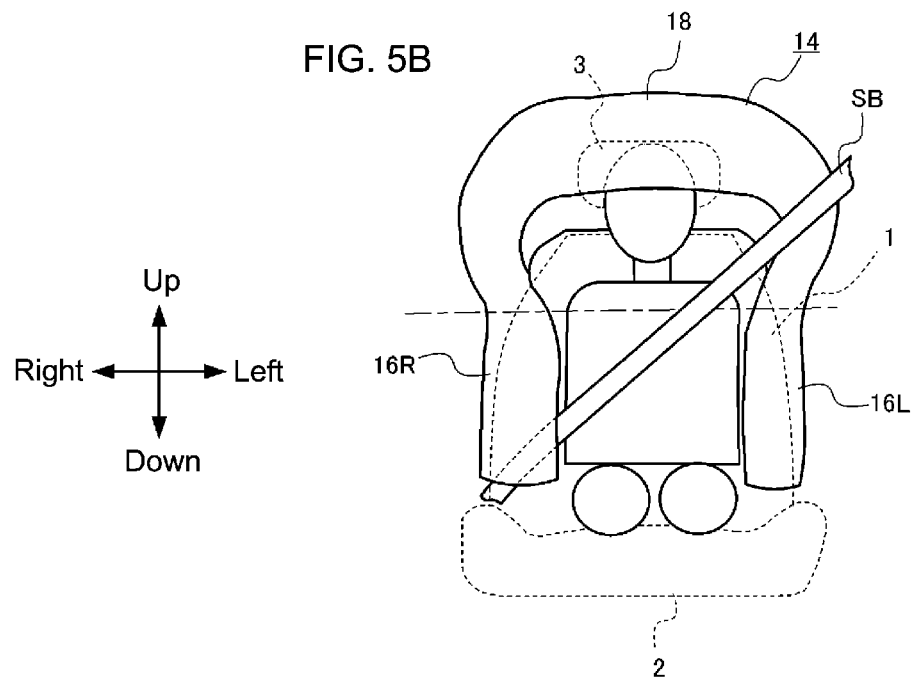

FIG. 5 illustrates the activated state (the deployed state of the airbag 14) of the airbag device according to Embodiment 1 of the present invention. (A) illustrates the state as viewed from the side surface in the vehicle width direction, and (B) illustrates a state viewed from the front surface.

When a side collision or the like occurs, the inflators 12L and 12R release expansion gas, causing the airbag 14 to expand and deploy. When the airbag 14 begins to expand, the gas flows into the lower portion areas 16L and 16R, and the upper portion area 18. The lower portion areas 16L and 16R of the airbag 14 deploy inside the side frames 10L and 10R and deploy toward the occupant direction (inner side) and forward (travel direction). At this time, since the lower portion areas 16L and 16R are deployed toward the occupant side with the inner surface (the surface on the occupant side) of the side frames 10L and 10R as the reaction force surface, the waist to the chest of the occupant can be quickly restrained.

On the other hand, the upper portion area 18 of the airbag 14 deploys forward from the upper end of the seatback 1, jumps over the headrest 3, and covers the back of the head of the occupant from behind towards the front. This avoids the upper portion area 18 directly impacting the head of the occupant when the airbag 14 deploys, and also enables forming a wide region of protection around the head of the occupant.

In this manner, since the upper portion area 18 of the airbag 14 is deployed outside of the side frames 10L and 10R, expansion occurs much more in the width direction thereof than for the lower portion areas 16L and 16R when viewed from the front, enabling reliably restraining from the shoulder to the periphery of the head of the occupant.

Additionally, the upper portion area 18 of the airbag 14 can enter the lower side of the seat belt SB near the shoulder of the occupant, and thus can be deployed by using the reaction force of the seatbelt SB, and the deployed shape around the head of the occupant is stable.

Embodiment 2

Figure 6A:
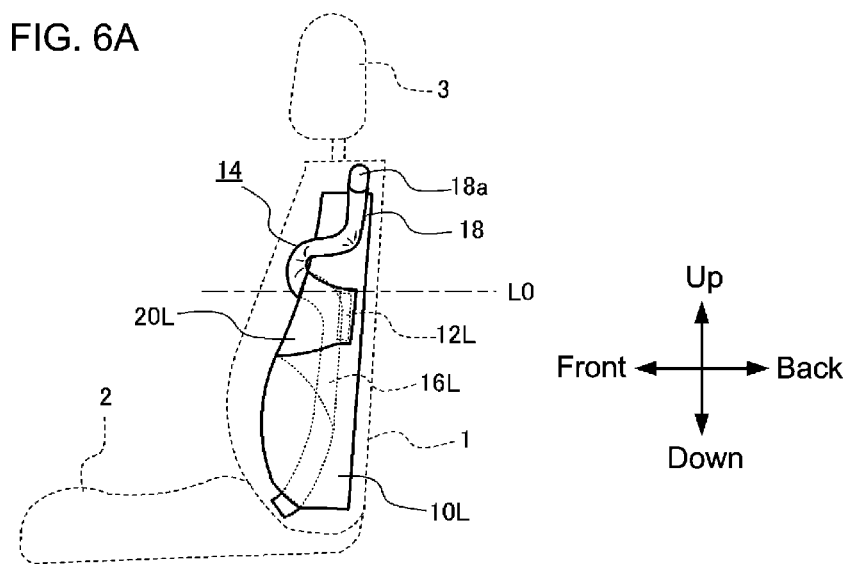
Figure 6B:
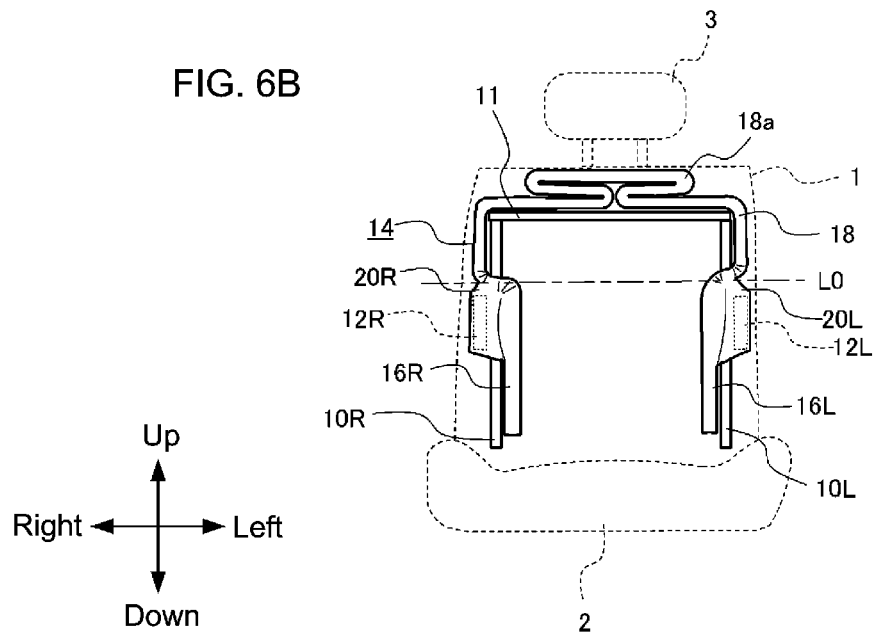

FIG. 6 is a side view (A) and front view (B) illustrating an airbag device according to Embodiment 2 of the present invention mounted in a vehicle seat, where the vehicle seat is illustrated as see-through. The structural elements in common or corresponding to Embodiment 1 above are labeled with the identical symbols, and redundant descriptions are omitted.

In the present embodiment, the inflators 12L and 12R are arranged on the outer side of the side frames 10L and 10R. The rest of the configuration is the same as that of Embodiment 1. By arranging the inflators 12L and 12R outside the side frames 10L and 10R, an installation location for the inflators 12L and 12R is readily ensured, in other words, the inflators 12L and 12R can readily be secured to the side frames 10L and 10R with a high degree of freedom.

Embodiment 3

Figure 8:
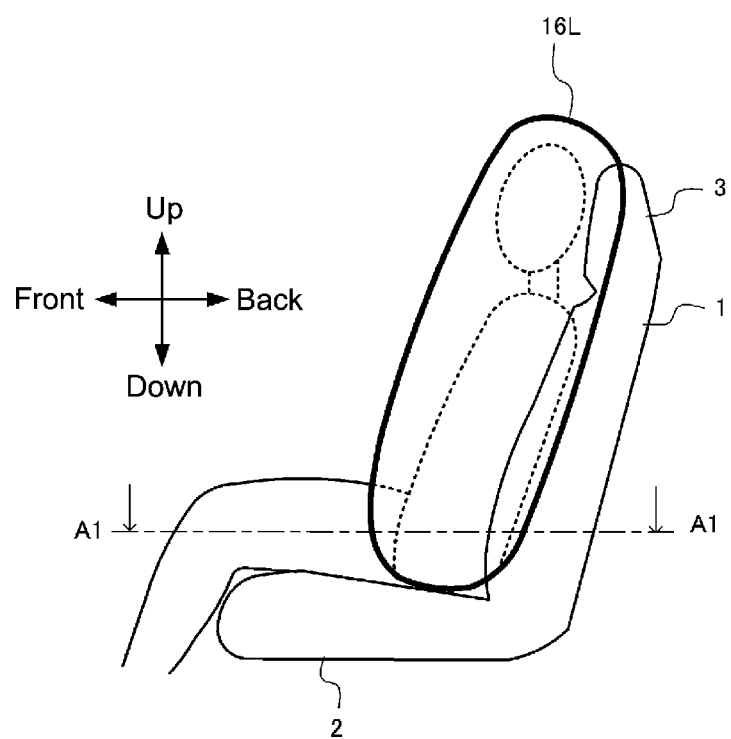
FIG. 8 is a schematic view illustrating the activated state (the deployed state of the airbag) of the airbag device according to Embodiment 3 of the present invention as viewed from the left side in the vehicle width direction.
Figure 9A:
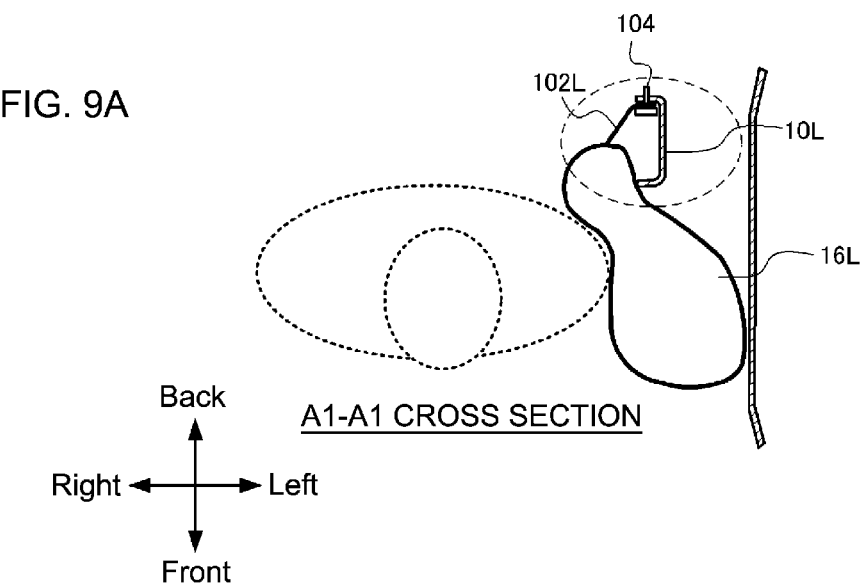
FIG. 9(A) is the schematic cross-sectional view in the A1-A1 direction of FIG. 8.
Figure 9B:
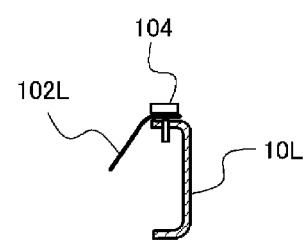
FIGS. 9(B) and (C) are cross-sectional views illustrating variations of the connecting structure between the seat frame and the tabs.

FIG. 7 illustrates the structure of the airbag 14 used in the airbag device according to Embodiment 3 of the present invention. (A) is a plan view illustrating the state where the airbag 14 is spread out (in the flat condition prior to being stowed), and (B) is a front view illustrating the state where the airbag 14 is in a rolled state (in the stowed condition). FIG. 8 is a schematic view illustrating the activated state (the deployed state of the airbag 14) of the airbag device according to Embodiment 3 of the present invention as viewed from the left side in the vehicle width direction. FIG. 9(A) is the schematic cross-sectional view in the A1-A1 direction of FIG. 8. FIGS. 9(B) and (C) are cross-sectional views illustrating variations of the connecting structure between the seat frame and the tabs.

The structural elements in common with or corresponding to Embodiment 1 and Embodiment 2 above are labeled with the identical symbols, and redundant descriptions are omitted. Additionally, in FIG. 8 and FIG. 9, only the left side of the seat is illustrated, but the right side has the same configuration.

In the present embodiment, the tabs 102L and 102R for securing are attached to the left and right lower end parts of the airbag 14. One end of these tabs 102L (102R) is connected to the lower portion region 16L (16R) of the airbag 14, and the other end is secured to the seat frame 10L (10R).

By securing the lower portion region 16L (16R) of the airbag 14 to the seat frame 10L (10R) using the tab 102L (102R), when the airbag 14 is deployed, the lower portion region 16L (16R) will not easily burst out forward or rattle more than necessary, and the deployment posture and deployment behavior of the lower portion region 16L (16R) will be stabilized. As a result, the vicinity of the waist of the occupant can reliably be restrained inside the seat frame 10L (10R).

Figure 9C:
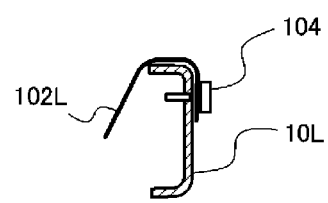

As illustrated in FIG. 9(A), the other end (rear end portion) of the tab 102L is secured by the fixture 104 on the inside of the rear end portion of the seat frame 10L. In addition, as illustrated in FIG. 9(B), the other end (rear end portion) of the tab 102L is secured by the fixture 104 to the outside of the rear end portion (rear surface side) of the seat frame 10L. Alternatively, as illustrated in FIG. 9(C), the other end (rear end portion) of the tab 102L reaches the outer side (the left side surface side) of the seat frame 10L through the rear of the rear end portion (rear surface portion) from the inside (occupant side) of the seat frame 10L, and is secured by the fixture 104.

The present invention has been described with reference to embodiments; however, the present invention is not limited to the embodiments described above. In other words, changes can be made as necessary without deviating from the scope of the technical concept of the invention.

The invention claimed is:

1. An airbag device in combination with a vehicle seat including a seat frame inside a seatback, the airbag device comprising:
   an inflator secured to the seat frame of the vehicle seat for generating expansion gas; and
   an airbag stowed in the seatback in an elongated compressed state and for expansion and deployment by the expansion gas discharged from the inflator,
   wherein:
   the airbag in a stowed state includes a lower portion area below the inflator and an upper portion area above the inflator arranged along the seat frame,
   the lower portion area is arranged inside the seat frame, and
   the upper portion area is arranged outside the seat frame.

2. The airbag device according to claim 1, wherein when the airbag is deployed, the lower portion area is configured to protect from a waist of an occupant to near a chest of the occupant, and the upper portion area is configured to protect near a head of the occupant.

3. The airbag device according to claim 1, wherein the lower portion area is arranged on both left and right sides of the seatback, and the upper portion area is arranged to connect upper end portions of lower portion areas on both the left and right sides.

4. The airbag device according to claim 3, wherein the upper portion area is deployable near an upper edge of the seatback for encircling a head of an occupant upon deployment of the airbag.

5. The airbag device according to claim 3, further comprising a further inflator, wherein the inflator and the further inflator are arranged on left and right sides of the seat frame, respectively, near a boundary between the lower portion area and the upper portion area.

6. The airbag device according to claim 1, wherein the inflator is arranged inside the seat frame.

7. The airbag device according to claim 1, wherein the inflator is arranged outside the seat frame.

8. The airbag device according to claim 1, wherein the airbag includes a securing tab with a first end connected to the lower portion area, and a second end of the securing tab secured to the seat frame.

9. The airbag device according to claim 8, wherein the first end of the securing tab is connected to a lowest part of the lower portion area.

10. The airbag device according to claim 8, wherein the second end of the securing tab is secured to a rear end portion of the seat frame.

11. The airbag device according to claim 8, wherein the second end of the securing tab extends so as to pass through a rear end portion of the seat frame, and is secured to an outside of the seat frame.

* * * * *